(12) United States Patent
Fried et al.

(10) Patent No.: US 9,438,094 B2
(45) Date of Patent: Sep. 6, 2016

(54) CONNECTING SYSTEM FOR CONNECTION OF AN ELECTRIC MACHINE TO A CONVERTER

(71) Applicant: ALSTOM Technology Ltd, Baden (CH)

(72) Inventors: Not-Curdin Fried, Windisch (CH); Damir Novosel, Oberentfelden (CH); Daniel Hediger, Othmarsingen (CH); Andre Arndt, Lupfig (CH); Hossein Safari Zadeh, Othmarsingen (CH); Gregoire Vienne, Fribourg (CH)

(73) Assignee: ALSTOM Technology Ltd, Baden (CH)

( * ) Notice: Subject to any disclaimer, the term of this patent is extended or adjusted under 35 U.S.C. 154(b) by 306 days.

(21) Appl. No.: 13/863,452

(22) Filed: Apr. 16, 2013

(65) Prior Publication Data

US 2014/0306558 A1  Oct. 16, 2014

(51) Int. Cl.
| | | |
|---|---|---|
| *H02K 47/00* | (2006.01) | |
| *H02K 47/18* | (2006.01) | |
| *H02K 47/20* | (2006.01) | |
| *H02K 47/22* | (2006.01) | |
| *H02K 5/22* | (2006.01) | |
| *H02K 47/30* | (2006.01) | |
| *H02K 9/28* | (2006.01) | |
| *H02K 3/40* | (2006.01) | |

(52) U.S. Cl.
CPC .............. *H02K 47/00* (2013.01); *H02K 5/225* (2013.01); *H02K 9/28* (2013.01); *H02K 47/18* (2013.01); *H02K 47/20* (2013.01); *H02K 47/22* (2013.01); *H02K 47/30* (2013.01); *H02K 3/40* (2013.01)

(58) Field of Classification Search
CPC ............ H01B 7/30; H01B 9/00; H01B 5/00; H01B 7/42; H01B 11/02; H02G 5/06; H02G 5/10; H02G 5/00; H02G 5/08; H02M 5/00; H02M 5/02; H02M 5/10; H02M 5/14; H02K 47/30; H02K 47/00; H02K 47/18; H02K 47/20; H02K 47/22
USPC ............ 174/526, 50, 24, 125.1, 33, 32, 377, 174/392; 310/59, 71; 307/147, 148, 91; 361/600, 611, 601; 363/148, 150
See application file for complete search history.

(56) References Cited

U.S. PATENT DOCUMENTS

| | | | | |
|---|---|---|---|---|
| 2,306,527 A | | 12/1942 | Daniels | |
| 2,992,290 A | * | 7/1961 | Swerdlow | .................... 174/16.2 |
| 3,249,773 A | * | 5/1966 | Barthold | ....................... 307/147 |

(Continued)

FOREIGN PATENT DOCUMENTS

| | | | | |
|---|---|---|---|---|
| SE | WO 0073102 A1 | * | 12/2000 | .............. H02M 5/14 |
| WO | 2007/113012 A1 | | 10/2007 | |

*Primary Examiner* — Terrance Kenerly
*Assistant Examiner* — Alexander Singh
(74) *Attorney, Agent, or Firm* — Rita D. Vacca

(57) ABSTRACT

The arrangement of an electric machine, a connecting system and a converter, includes the connecting system connected between the electric machine and the converter. The connecting system has an enclosure that houses non-shielded conductors each non-shielded conductor is connected between a phase of the electric machine and the inner side of the converter. The non-shielded conductors of the connecting system that are connected to an operating phase of the electric machine are adjacent to conductors of the connecting system that are not connected to operating phases of the electric machine.

19 Claims, 5 Drawing Sheets

(56) References Cited

U.S. PATENT DOCUMENTS

| | | | |
|---|---|---|---|
| 3,531,653 A * | 9/1970 | Willyoung | 307/147 |
| 3,869,562 A * | 3/1975 | Eidinger et al. | 174/15.6 |
| 4,378,461 A * | 3/1983 | Haginomori | 174/16.2 |
| 4,992,623 A * | 2/1991 | Briley et al. | 505/220 |
| 5,053,584 A * | 10/1991 | Chojnowski | 174/99 B |
| 5,173,572 A * | 12/1992 | Martin | 174/16.2 |
| 5,811,734 A * | 9/1998 | Ponsioen | 174/99 B |
| 6,418,980 B1 | 7/2002 | Larquet et al. | |
| 2001/0052732 A1* | 12/2001 | Shima et al. | 307/147 |
| 2002/0093840 A1* | 7/2002 | Lacaze | H02M 5/271 363/152 |
| 2008/0231127 A1* | 9/2008 | Lacaze | 310/71 |

* cited by examiner

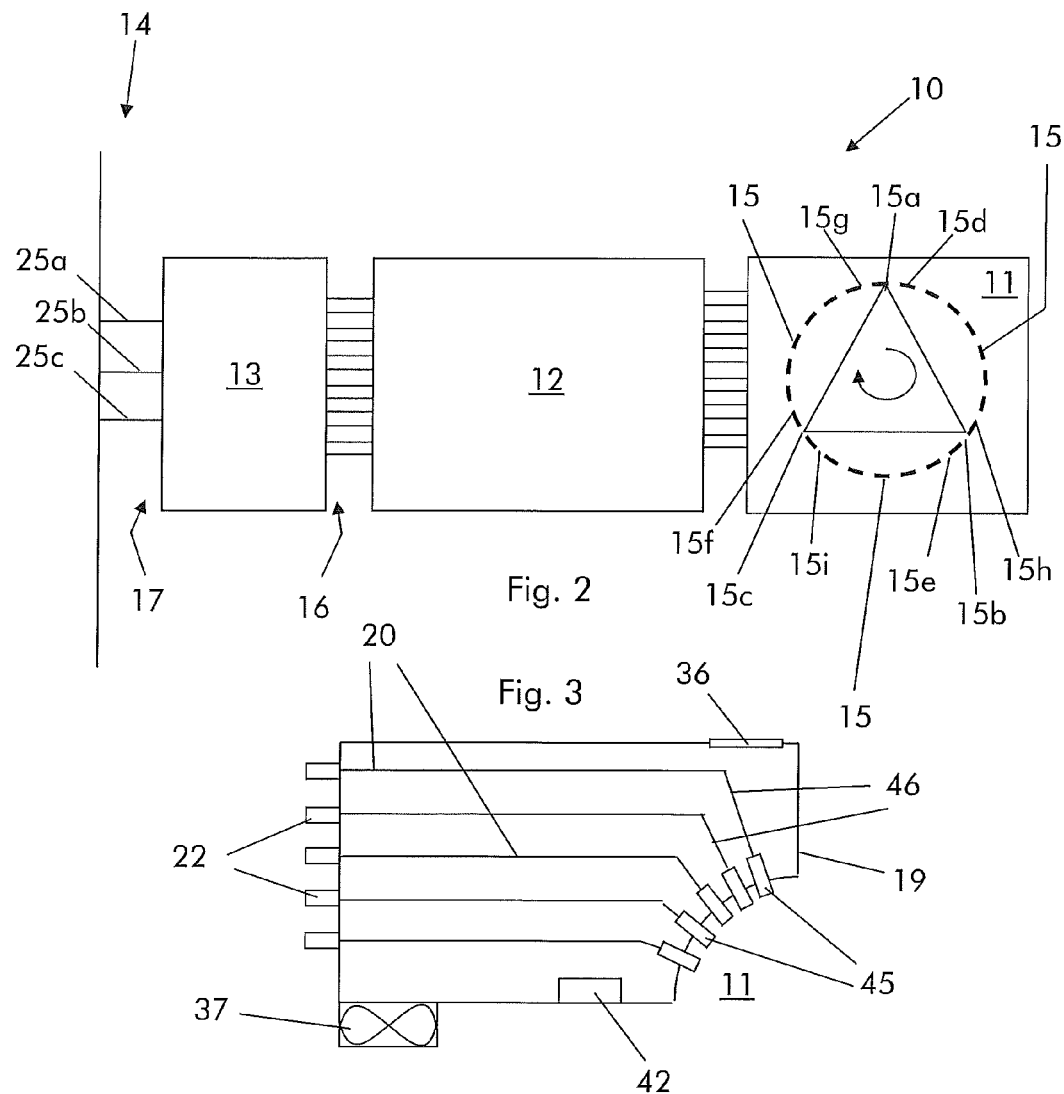

US 9,438,094 B2

CONNECTING SYSTEM FOR CONNECTION OF AN ELECTRIC MACHINE TO A CONVERTER

TECHNICAL FIELD

The present disclosure relates to a connecting system for connection of an electric machine to a converter.

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

BACKGROUND

In order to connect an electric machine (such as an electric generator) to another electric component (such as a converter) usually shielded conductors are used.

FIG. 1a schematically shows an example of conductors 1 in a segregated arrangement; each conductor 1 comprises a conductive element 2 for example made of copper or aluminum, and a conductive shielding 3, for example made of aluminum. Between the conductive element 2 and the shielding 3 an air gap 4 is provided.

These conductors are widely used but in some applications could have some drawbacks.

In fact, the air gap 4 and shielding 3 sensibly increase the conductor diameter; thus when a lot of conductors must be provided to connect a lot of terminals together, the shielded conductors require a lot of space.

In addition, because of the air gap 4 and shielding 3, during operation cooling of these conductors is not efficient; in particular cooling requires powerful cooling systems to appropriately cool the conductive elements 2. These cooling systems consume a large power and thus affect efficiency.

In addition, these conductors can cause high losses in the shielding 3 for proximity effect.

FIG. 1b shows an example of conductors 1 in a non-segregated arrangement; in this case a number (usually three) of conductive elements 2 are all housed in the shielding 3.

This non-segregated arrangement of conductive elements 2 is more compact than the segregated arrangement, nevertheless since no insulation is provided between conductive elements 2, it can be used only when the differential voltage among the conductive elements 2 is low.

SUMMARY

An aspect of the disclosure includes providing a connecting system that is compact.

Another aspect of the disclosure includes providing a connecting system with an efficient cooling.

A further aspect of the disclosure includes providing a connecting system with reduced problems caused by proximity effect.

These and further aspects are attained by providing a connecting system in accordance with the accompanying claims.

Advantageously, a compact system also that causes low losses during operation is obtained by providing a particular organization of non-shielded conductors (i.e. conductors without shielding), the particular organization of the conductors allowing a small or null differential voltage during operation between adjacent non-shielded conductors that are connected to a grid phase at the same time.

In addition, advantageously the system is less expensive than existing systems and allows a higher number of phases (more than three) for application in classified zone

BRIEF DESCRIPTION OF THE DRAWINGS

Further characteristics and advantages will be more apparent from the description of a preferred but non-exclusive embodiment of the arrangement illustrated by way of non-limiting example in the accompanying drawings, in which:

FIG. 2 shows an arrangement comprising an electric machine, a connecting system, a converter and an electric grid;

FIG. 3 shows an embodiment of a connecting system;

DETAILED DESCRIPTION OF EXEMPLARY EMBODIMENTS

Figure 1A:
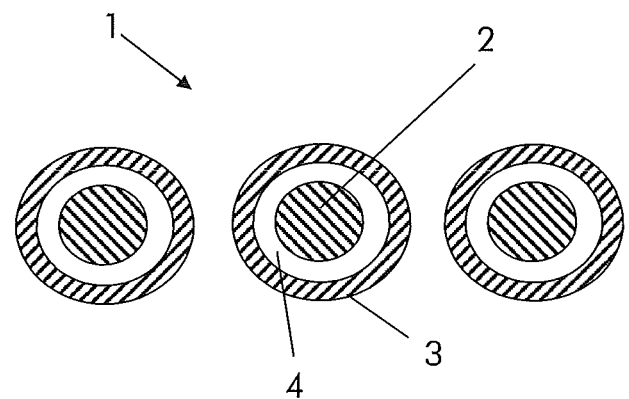
FIGS. 1a and 1b are schematic views of conductors.
Figure 1B:
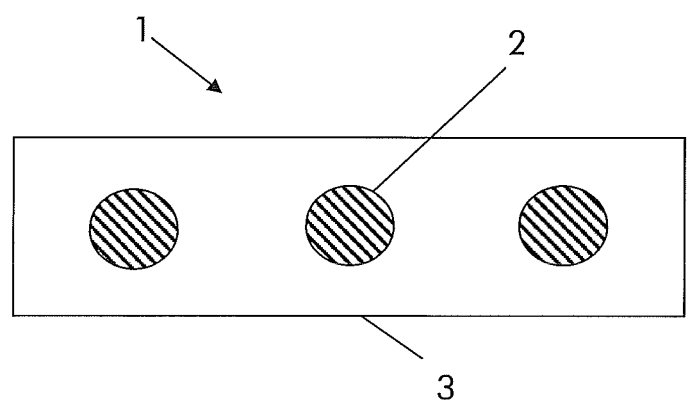

FIG. 2 schematically shows an arrangement 10 that includes an electric machine 11, a connecting system 12 and a converter 13; the converter 13 is connected to an electric grid 14.

For example the electric machine 11 is a generator, such as a turbogenerator (i.e. a synchronous generator connected to a gas or steam turbine); different electric machines are anyhow possible such as hydro generators or electric motors. It is clear that the arrow indicating the direction of rotation of the rotor is only exemplificative and both rotation directions (i.e. the one shown and the opposite direction) are possible.

The electric machine has more than three phases 15; advantageously the number of phases 15 of the electric machine is a multiple of 3 and for example the phases can be more than 3 and up to 54, 57 or even more.

The connecting system 12 is connected between the electric machine 11 and the converter 13 and is used to transfer the electric power between the electric machine 11 and converter 13.

In particular, when the electric machine 11 is an electric generator, the connecting system 12 transfers electric power from the electric machine 11 to the converter 13 and thus to the electric grid 14.

Between the grid 14 and the converter 13 a step up transformer is usually provided.

In contrast, when the electric machine 11 is a motor, the connecting system 12 transfers electric power originating from the electric grid 14 and the converter 13 to the electric machine 11.

In this example the converter connects only some of the phases 15 to the grid; preferably the converter 13 connects only three phases to the grid, for example only one of the phases 15 is connected in each moment to each phase 25a-c of the grid 14.

The converter 13 has an inner side 16 that is connected to the connecting system 12 and an outer side 17 that is connected to the electric grid 14.

FIG. 3 schematically shows that the connecting system 12 has an enclosure 19 that houses non-shielded conductors 20 (for example made of copper or aluminum, anyhow any appropriate material can be used also different from copper or aluminum). The conductors 20 can have a cross section having any shape, such as a circular, square, rectangular shape or also other different shapes. For example the conductors can be defined by two or more pieces (for example four pieces) and can define one or more cooling channel.

The non-shielded conductors 20 can for example be nude conductors (i.e. conductors without any covering around them, in other words bare conductors) and/or insulated conductors (i.e. conductors with insulation around them).

The conductors 20 are connected between a phase 15 of the electric machine 11 (via bushings 45) and terminals 22 connected to the inner side 16 of the converter 13.

The converter outer side 17 has a number of phases 25a, 25b, 25c that is different from the number of phases 15 of the electric machine 11. For example, the number of phases 25a, 25b, 25c of the converter outer side 17 is three, because it is connected to the three-phase electric grid 14.

At the electric machine 11, a number of phases 15 equal to or greater than the number of phases 25a-c of the converter outer side 17 can operate substantially at the same time.

In the following the operating phases of the electric machine 11 are indicated by references 15a, 15b, 15c, and the conductors of the connecting system 12 connected to them are identified by references 20a, 20b, 20c. Operating phase is to be intended as a phase that is connected to the grid 14 such that there is an electric current passing through it, whereas a non-operating phases is to be intended as a phase that is not connected to the grid (because of the configuration at the converter 13) such that there is no or almost no current passing through it.

The conductors 20a-c of the connecting system 12 that are connected to an operating phase 15a-c of the electric machine 11 are adjacent to conductors 20 of the connecting system 12 that are not connected to operating phases 15a-c of the electric machine 11.

Thanks to this solution, the losses due to proximity effect and the electric distances are reduced, because the differential voltage between adjacent conductors is small. In addition, since losses are reduced and cooling is efficient thanks to the conductors without any individual shielding, a substantially low cooling is needed. In addition to these features, the connecting system is also substantially compact, because the space is advantageously used by putting conductors having significantly large different voltages far apart from one another.

Preferably, each of the conductor 20a-c that is connected to an operating phase 15a-c of the electric machine 11 is preferably not adjacent to the other conductors 20 connected to other operating phases.

For example, the conductors 20 of the connecting system 12 are connected to the phases of the electric machine 11 that are electrically shifted zero, one or two steps forward (phases 15e-f) or backward (phases 15h-i) with respect to the other conducting phases 15a-c.

In other words:

the conductor 20a is preferably not adjacent to the conductors 20 connected to the phases 15e, 15f and 15h, 15i of the electric machine 11, the conductor 20b is preferably not adjacent to the conductors 20 connected to the phases 15d, 15f and 15g, 15i of the electric machine 11, and the conductor 20c is preferably not adjacent to the conductors 20 connected to the phases 15d, 15e and 15g, 15h of the electric machine 11.

Figure 4:
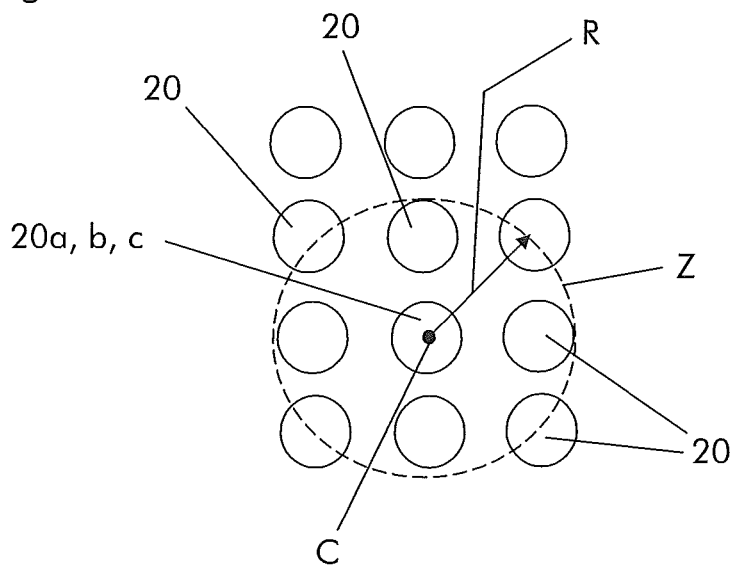
FIG. 4 shows an embodiment of conductors of the connecting system.

For example, (FIG. 4), the adjacent conductors 20 are those conductors that are at least partly included in a circular zone Z with a given radius R and centered in the center C (preferably the geometric center) of the cross section of the conductors 20. The radius R is such that the losses due to proximity effect are negligible. For example (see FIG. 4) the radius is equal to the diameter of the conductor 20 plus the diameter of the conductors 20 divided by 2 plus the shortest distance between two conductors 20.

Preferably the phases 15a-c of the electric machine 11 that operate substantially at the same time are electrically equidistant from one another.

For phases that operate at the same time it is meant phases having a current substantially different from zero passing through them at the same time.

For electrically equidistant it is meant that the angle of the electric voltage and/or current through different operating phases is the same. For example, the phases 15a-c are electrically shifted by 120 degree, because 3 phases 15a-c operates substantially at the same time.

The enclosure 19 is preferably made of an electrically conductive material, such that it can magnetically shield all the conductors 20 from the outside. It is clear that the enclosure 19 can also be covered with a thermal insulation material.

During operation the electric machine 11 (in this example it is an electric generator) generates a multi-phase voltage, with phases that are electrically shifted by 360°/number of phases.

This voltage is combined in a known manner at the converter 13 to supply an AC three-phase sinusoidal electric power to the grid 14 (thus the converter 13 connects preferably three of the generator's phases at the same time to the connecting system and thus to the electric grid, defining the operating phases).

During operation cooling is needed, because of the large electric power conveyed through the conductors 20.

In order to cool the conductors 20 and the connecting system 12, a number of different cooling schemes are possible.

Figure 5:
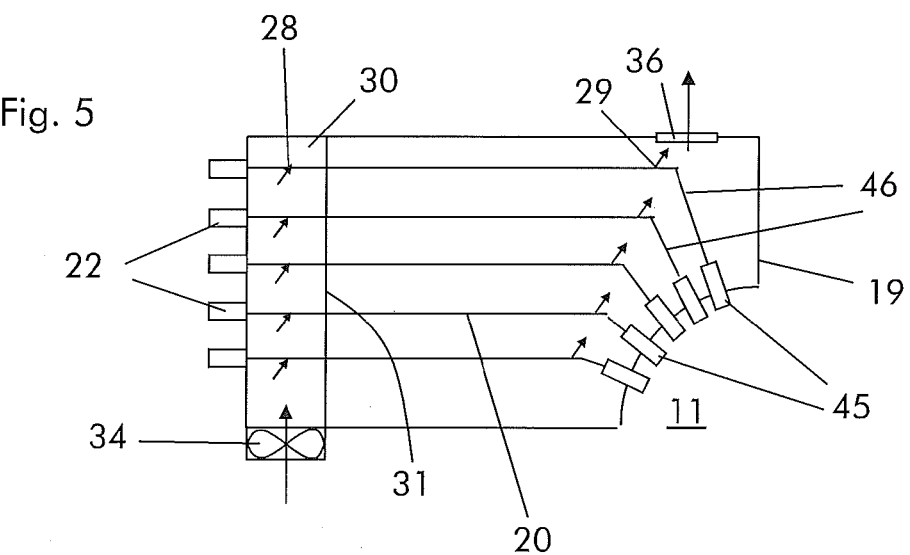
FIG. 5 shows an embodiment of cooling methods for the connecting system.
Figure 6:
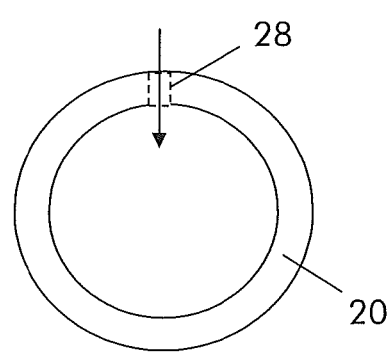
FIGS. 6 and 7 show embodiments of conductors.
Figure 7:
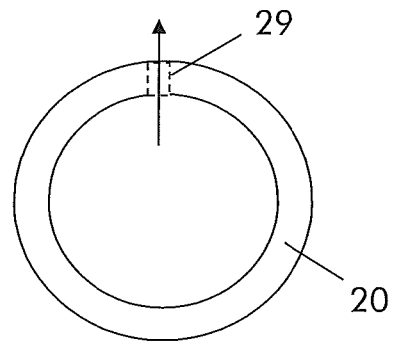
Figure 8:
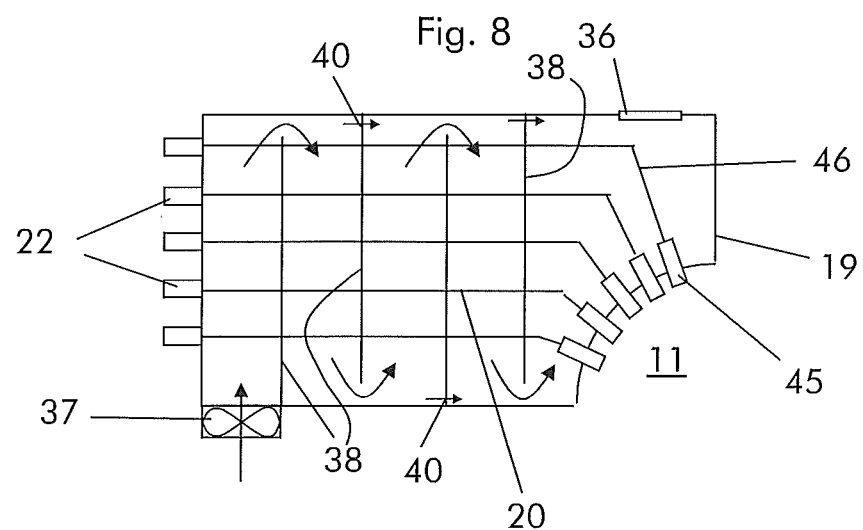
FIGS. 8 and 9 show additional embodiments of cooling methods for the connecting system.

In a first embodiment (FIG. 5) the conductors 20 have a tubular structure (FIGS. 6, 7) with inlets 28 and outlets 29 for a cooling gas. The inlets 28 and preferably also the outlets 29 are defined by apertures in the conductors 20. The apertures defining the inlets 28 and outlets 29 open inside of the enclosure 19.

Figure 10:
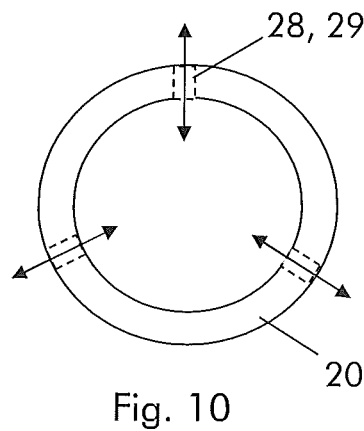
FIGS. 10-11 show other embodiments of conductors.
Figure 11:
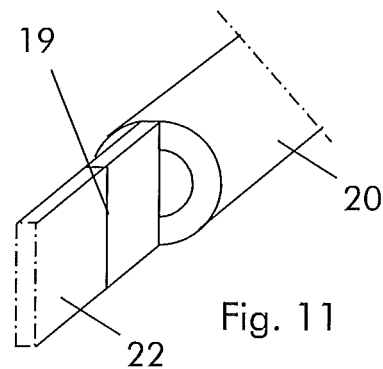
Figure 12:
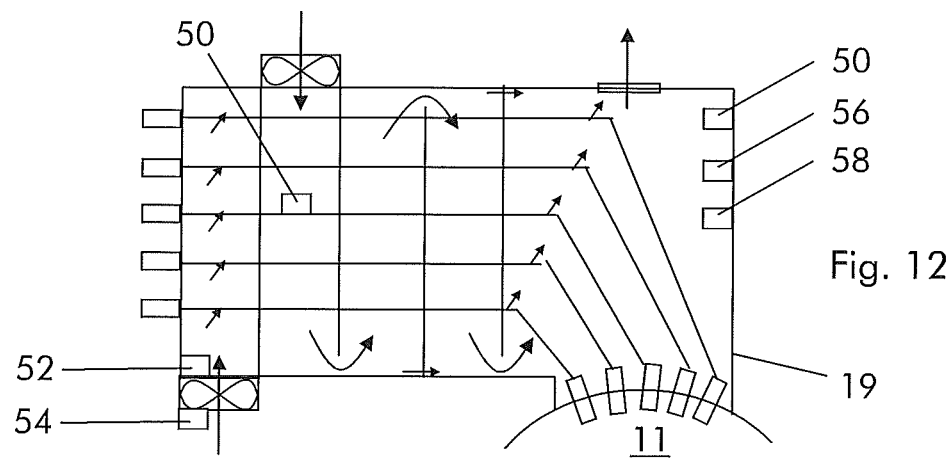
FIGS. 12-13 show different embodiments of the connecting system.
Figure 13:
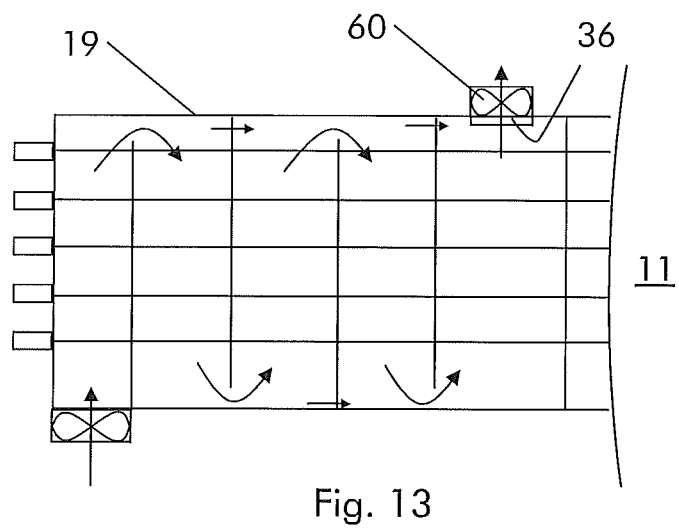

FIGS. 10 and 11 show different embodiments of conductors 20 with a plurality of inlets/outlets (FIG. 10) and inlets/outlets defined at the end of a tubular conductor 20.

In addition, the enclosure 19 can have a chamber 30 that partly houses the conductors; for example a wall 31 together with a part of the enclosure 19 defines the chamber 30 and the conductors 20 penetrate the wall 31. In this example, the inlets 28 of the conductors 20 open in the chamber 30 and the outlets 29 open outside of the chamber 30 (but inside of the enclosure 19).

Advantageously, the connecting system also has one or more fans or compressors 34 to supply a cooling gas into the chamber 30. In this embodiment the fan or compressor 34 supplies a cooling gas such as air into the chamber 30. From the chamber 30 the cooling gas enters the conductors 20 through the inlets and passes through them, cooling them. Then the cooling gas moves out of the conductors 20 through the outlets 29 and is discharged outside of the enclosure 19 through an aperture 36 thereof. A purge system for the enclosure 19 can also be provided; in particular the purge system is preferably provided when the electric machine is a hydrogen cooled electric machine, to avoid hydrogen accumulation (hydrogen coming from seal leakage of bushings 45).

For example the fan 34 can supply a part of the flow inside of the enclosure 19 (but outside of the chamber 30) to purge it. For example the wall 31 can be placed on the top of the fan or compressor 34 to split the gas flow.

This way a part of the flow from fan or compressor 34 will purge the enclosure 19 to remove potential accumulated hydrogen.

Naturally also different embodiments are possible such as a dedicated fan or compressor for purging.

Figure 9:
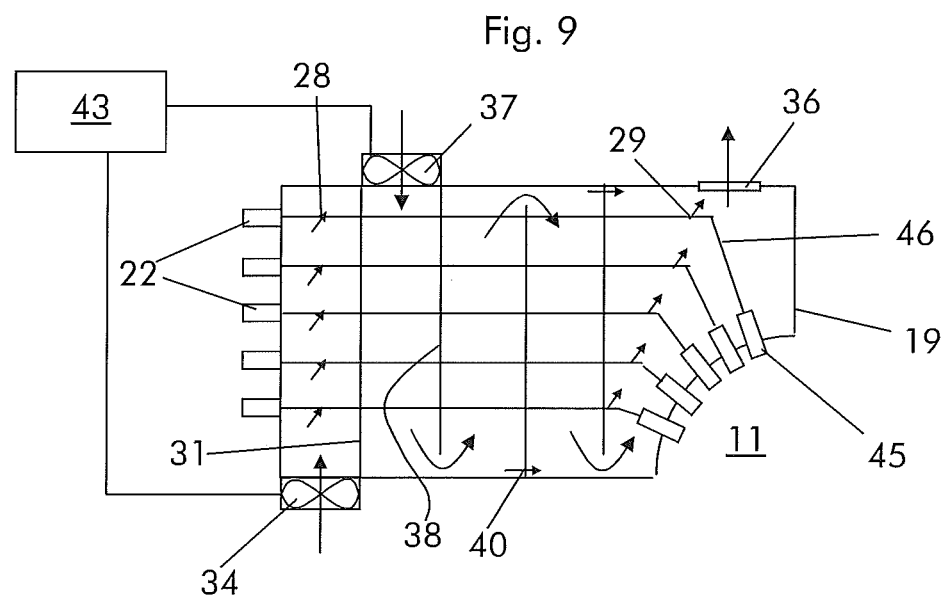

In a different embodiment (FIG. 9), the enclosure 19 includes at least a fan or compressor 37 for conveying a cooling gas such as air around the conductors 20.

In addition, a sucking fan 60 can be provided at the aperture 36 instead of or together with the fan or compressor 34 and/or compressor or fan 37.

Preferably the enclosure 19 includes walls 38 defining a cooling circuit for the cooling gas.

The walls 38 are connected to and extend from the enclosure 19. In addition, the walls 38 can have bypasses 40 at zones connected to the enclosure 19. For example the bypasses are defined by apertures through the walls 38.

In this embodiment the cooling gas is supplied into the enclosure 19 by the fan or compressor 37, passes through the circuit defined by the walls 38 cooling the conductors 20 and is then discharged from the enclosure 19 through the aperture 36. According to this scheme the cooling gas has a cooling and purging effect.

Naturally also cooling (and purging) schemes including features of the above-described embodiments are possible.

In other embodiments, the cooling scheme can include:
one or more suction fans (to have a pressure inside of the enclosure 19 lower than the atmospheric pressure),
one or more pressure fans or compressors (to have a pressure inside of the enclosure 19 higher than the atmospheric pressure),
no zig-zag circulation (i.e. no walls 38),
outlet 36 at the top or side (for example close to the bushings 45),
a protection at the outlet 36,
the inside of the enclosure 19 in overpressure,
the inside of the enclosure 19 in under pressure, filters at the fans or compressors 34, 37,
filters at the aperture 36,
filters at the inlet and/or outlet,
redundant components (in particular fans and/or compressors 34 and/or 37),
shutters for the fans or compressors, to avoid circulation shortcuts,
measuring devices,
etc.

A heater 42 (an electric or a different kind of heater) is preferably provided to heat the inside of the enclosure 19, in order to prevent water condensation within the enclosure 19 when the temperature inside of the enclosure 19 would become lower than the temperature outside of the enclosure 19 (environment temperature); this could happen in particular when the electric machine 11 is not running.

In addition the fans or compressors 34, 37 can be controlled by a controller 43, such that the temperature inside of the enclosure 19 during operation is higher than the temperature outside of the enclosure 19 (environment temperature). This can be needed in particular at locations whose environment temperature is high or very high.

The enclosure is preferably sealed (except the inlet and outlet openings) in order to prevent cooling gas leakage therefrom.

Preferably the conductors 20 are not directly connected to the electric machine 11 (in particular to the bushings 45 of the electric machine 11), but flexible connections 46 are provided in-between to adsorb deformations and possible vibrations. The connections 46 can also be tubular and can receive cooling gas from the bushings 45 and/or conductors 20.

In advantageous embodiments, one or more temperature sensors 50 for the temperature of the enclosure 19 and/or conductors 20 and/or gas or air inside the enclosure 19 can be provided, to monitor these temperatures and avoid they become too high.

In addition, also pressure sensors 50, 52 can be provided, to monitor the operation of the fan or compressor 37 and/or cooling circuit within the enclosure 19. If the pressure drop between the pressure sensor 54 and the pressure sensor 52 is too high, there is an indication that the filter associated to the fan or compressor 37 needs to be replaced. Alternatively, if the pressure measured by the pressure sensor 52 increases, there is an indication that the cooling circuit (i.e. the circuit inside the enclosure 19) could be blocked.

In addition hydrogen and/or propane concentration sensors 56 can be provided to monitor the hydrogen and/or propane pressure inside the enclosure 19 for safety reasons and/or regulate the generator power, and/or fan and/or compressor power accordingly.

In addition a humidity sensor 58 can also be provided within the enclosure 19.

Naturally the features described may be independently provided from one another.

In practice the materials used and the dimensions can be chosen at will according to requirements and to the state of the art.

The invention claimed is:
1. Arrangement of an electric machine, comprising:
a connecting system and a converter,
wherein the electric machine has more than three phases, the connecting system is connected between the electric machine and the converter, and the converter has an inner side connected to the connecting system and an outer side,
wherein the connecting system has an enclosure that houses non-shielded conductors, each non-shielded conductor is connected between a phase of the electric machine and the inner side of the converter,
wherein the converter outer side has a number of phases that is different from the number of phases of the electric machine,
wherein a number of phases of the electric machine equal to or greater than the number of phases of the converter outer side operates substantially at a same time, first non-shielded conductors of the connecting system are connected to an operating phase of the electric machine and are adjacent to second non-shielded conductors of the connecting system that are not connected to operating phases of the electric machine,
wherein adjacent first and second non-shielded conductors are not connected to operating phases at the same time so that a differential voltage between these adjacent conductors is substantially zero, wherein at each moment in time an operating phase of the electric machine is a phase through which current passes, and wherein the adjacent first and second non-shielded conductors are those conductors that are partly and fully included in a circular zone centered at a center of the cross section of the conductors.

2. Arrangement according to claim 1, wherein each of the conductors that is connected to a conducting phase of the electric machine is not adjacent to the conductors of the connecting system that are connected to the phases of the electric machine that are electrically shifted zero or one or two steps forward or backward with respect to the other conducting phases of the electric machine.

3. Arrangement according to claim 2, wherein the adjacent conductors are those conductors that are at least partly included in a circular zone with a given radius and centered in the center of the cross section of the conductor.

4. Arrangement according to claim 1, wherein the given radius is a radius in which losses due to proximity effect are negligible.

5. Arrangement according to claim 1, wherein the phases of the electric machine that operate substantially at the same time are electrically equidistant from one another.

6. Arrangement according to claim 1, wherein the electric machine is an electric generator.

7. Arrangement according to claim 1, wherein a radius of the circular zone is equal to a diameter sum divided by two plus a shortest distance between two adjacent conductors, the diameter sum being equal to a diameter of the first non-shielded conductor plus the diameters of the second non-shielded conductors.

8. A connecting system for connection of an electric machine to a converter, comprising:

an enclosure made of an electrically conductive material that houses more than three non-shielded conductors, wherein the non-shielded conductors have a tubular structure with inlets and outlets for a cooling gas, wherein adjacent non-shielded conductors are not connected to operating phases at the same time so that a differential voltage between these adjacent conductors is substantially zero, and wherein the adjacent conductors are those conductors that are partly and fully included in a circular zone centered at a center of the cross section of the conductors.

9. The connecting system of claim 8, wherein the non-shielded conductors have a tubular structure with inlets and outlets for a cooling gas.

10. The connecting system of claim 9, wherein at least the inlets are defined by apertures in the non-shielding conductors, wherein the apertures open inside of the enclosure.

11. The connecting system of claim 10, wherein the enclosure has at least a chamber that partly houses the conductors, wherein the inlets of the conductors open in the chamber and the outlets open outside of the chamber.

12. The connecting system of claim 11, further comprising a fan or compressor to supply a cooling gas into the chamber.

13. The connecting system of claim 8, wherein the enclosure includes at least a fan or compressor for conveying a cooling gas around the non-shielded conductors.

14. The connecting system of claim 8, further comprising a purge system for the enclosure.

15. The connecting system of claim 14, wherein the enclosure includes walls defining a cooling circuit.

16. The connecting system of claim 8, wherein the enclosure includes walls defining a cooling circuit.

17. The connecting system of claim 16, wherein walls are connected to and extend from the enclosure, wherein the walls have at least a bypass zone connected to the enclosure.

18. The connecting system of claim 8, further comprising a heater to heat the inside of the enclosure.

19. The connecting system of claim 8, wherein a radius of the circular zone is equal to a diameter sum divided by two plus a shortest distance between two adjacent conductors, the diameter sum being equal to a diameter of a first non-shielded conductor plus the diameters of second non-shielded conductors.

* * * * *

UNITED STATES PATENT AND TRADEMARK OFFICE
CERTIFICATE OF CORRECTION

PATENT NO. : 9,438,094 B2
APPLICATION NO. : 13/863452
DATED : September 6, 2016
INVENTOR(S) : Fried et al.

Page 1 of 1

It is certified that error appears in the above-identified patent and that said Letters Patent is hereby corrected as shown below:

In the Claims

In Column 8, Line 3, in Claim 8, delete "adiacent" and insert -- adjacent --, therefor.

Signed and Sealed this
Seventh Day of February, 2017

Michelle K. Lee
*Director of the United States Patent and Trademark Office*